United States Patent
You

(10) Patent No.: US 8,989,943 B2
(45) Date of Patent: Mar. 24, 2015

(54) UNMANNED AUTONOMOUS TRAVELING SERVICE APPARATUS AND METHOD BASED ON DRIVING INFORMATION DATABASE

(71) Applicant: Hyundai Motor Company, Seoul (KR)

(72) Inventor: Byung Yong You, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 13 days.

(21) Appl. No.: 13/895,647

(22) Filed: May 16, 2013

(65) Prior Publication Data

US 2014/0172220 A1 Jun. 19, 2014

(30) Foreign Application Priority Data

Dec. 14, 2012 (KR) .......................... 10-2012-0146569

(51) Int. Cl.
| | | |
|---|---|---|
| G01C 22/00 | (2006.01) | |
| G05D 1/02 | (2006.01) | |
| G01C 21/36 | (2006.01) | |
| B60W 30/12 | (2006.01) | |
| G01S 13/93 | (2006.01) | |

(52) U.S. Cl.
CPC .......... G05D 1/0297 (2013.01); G01C 21/3658 (2013.01); B60T 2201/08 (2013.01); B60W 30/12 (2013.01); G01S 2013/9342 (2013.01); B60T 2201/087 (2013.01)
USPC ................. 701/23; 701/36; 701/41; 701/117; 701/469; 180/170; 340/438

(58) Field of Classification Search
CPC ............... B60W 30/12; B60T 2201/08; B60T 2201/022; B60T 2201/087; G01C 21/3658; G08G 1/20; G01S 13/931; G01S 2013/9342

USPC ............. 701/22, 23, 25, 27, 36, 98, 301, 469, 701/41, 117; 180/170; 340/436, 438, 903
See application file for complete search history.

(56) References Cited

U.S. PATENT DOCUMENTS

| | | | | |
|---|---|---|---|---|
| 5,999,865 | A * | 12/1999 | Bloomquist et al. ............ | 701/25 |
| 2005/0197752 | A1 | 9/2005 | Yang et al. | |
| 2011/0125344 | A1 | 5/2011 | An et al. | |
| 2011/0130918 | A1 | 6/2011 | Kim et al. | |
| 2012/0072075 | A1 * | 3/2012 | Choe et al. ...................... | 701/41 |
| 2012/0123628 | A1 * | 5/2012 | Duggan et al. .................. | 701/24 |
| 2012/0310465 | A1 * | 12/2012 | Boatright et al. ............... | 701/25 |

FOREIGN PATENT DOCUMENTS

| | | |
|---|---|---|
| JP | 2000112523 A | 4/2000 |
| JP | 2001175984 A | 6/2001 |

(Continued)

Primary Examiner — Gertrude Arthur Jeanglaude
(74) Attorney, Agent, or Firm — Mintz Levin Cohn Ferris Glovsky and Popeo, P.C.; Peter F. Corless

(57) ABSTRACT

An unmanned autonomous traveling service apparatus and method based on driving information database that allows an unmanned autonomous traveling vehicle to be autonomously operated stably without performing a large scale computing process in real time by allowing the unmanned autonomous traveling vehicle to be autonomously operated based on driving information generated in a database and allowing the unmanned autonomous traveling vehicle to be autonomously operated based on an installed sensor at the time of a traffic lane change or an unexpected situation. In particular, the driving information is collected from drivers throughout the world to create the database for the driving information.

10 Claims, 2 Drawing Sheets

(56) References Cited

FOREIGN PATENT DOCUMENTS

| KR | 10-1998-073974 | 11/1998 |
| KR | 10-0571837 | 4/2006 |
| KR | 10-2011-0058384 | 6/2011 |
| KR | 101145112 B1 | 5/2012 |
| KR | 101155565 B1 | 6/2012 |

* cited by examiner

UNMANNED AUTONOMOUS TRAVELING SERVICE APPARATUS AND METHOD BASED ON DRIVING INFORMATION DATABASE

CROSS-REFERENCE TO RELATED APPLICATION

This application is based on and claims priority from Korean Patent Application No. 10-2012-0146569, filed on Dec. 14, 2012 in the Korean Intellectual Property Office, the disclosure of which is incorporated herein in its entirety by reference.

BACKGROUND

1. Field of the invention

The present invention relates to an unmanned autonomous traveling service apparatus and method based on driving information database, and more particularly, to a technology in which driving information from drivers throughout the world (such as country information, departure point information, destination point information, location information, steering information, deceleration/acceleration information and traffic lane information) is collected and configured as a database, thereby providing unmanned autonomous traveling service based thereon.

2. Description of the Prior Art

In recent years, the states of Nevada and Florida in the U.S. have passed laws regarding the operation of autonomous vehicles, in which unmanned autonomous vehicles can travel on roads along with normal vehicles. Unmanned autonomous traveling vehicles are divided into distinct groups based on the type of travel an infrastructure-based traveling type and a sensor-based traveling type.

In an infrastructure-based traveling system, infrastructure is provided on a road and an autonomous traveling vehicle travels along a defined path. Although it is possible to control the autonomous traveling vehicle relatively stably, it requires a tremendous amount of cost to establish the infrastructure.

In the sensor-based traveling system, an unmanned autonomous traveling vehicle itself analyzes environments to create a path, and travels along the path according to signals received form the on-board sensors. As such, the sensor based system is much cheaper to implement than the infrastructure-based autonomous traveling system. However, the operational stability of the vehicle is not guaranteed under various environmental changes. Additionally, a real time large scale computing process is required.

Therefore, there is a need for an autonomous traveling scheme which encompasses both of the infrastructure-based autonomous traveling scheme and the sensor-based autonomous traveling scheme.

SUMMARY

Accordingly, the present invention has been made to solve the above-mentioned problems occurring in the prior art while advantages achieved by the prior art are maintained intact.

One subject to be achieved by the present invention is to provide an unmanned autonomous traveling service apparatus and method based on driving information database that allows an unmanned autonomous traveling vehicle to be autonomously operated stably without performing a large scale computing process in real time by allowing the unmanned autonomous traveling vehicle to be autonomously operated based on driving information embodied as a database that is collected over time form conventional driving operations and allowing the unmanned autonomous traveling vehicle to be autonomously operated based on installed sensors at the time of a traffic lane change or during an unexpected occurrence, in collecting the driving information from drivers throughout the world to create the database for the driving information and providing an unmanned autonomous traveling vehicle based on the database.

In one aspect of the present invention, there is provided an unmanned autonomous traveling service apparatus based on driving information database, the apparatus including: a controller that includes a driving information collecting unit configure to collect driving information from normal vehicles (i.e., non-autonomous vehicle); a control unit configured to create steering information for each traffic lane on a road based on the driving information collected by the driving information collecting unit; a driving information database that stores the steering information for each traffic lane on a road created by the control unit; and an automotive communication unit configured to receive path information, traffic lane information and location information from an unmanned autonomous traveling vehicle, and transmit steering information on a corresponding traffic lane to the unmanned autonomous traveling vehicle.

In another aspect of the present invention, there is provided an unmanned autonomous traveling service method based on driving information database, the method including: collecting, by a driving information collecting unit within a server, driving information from normal vehicles; creating, by a control unit within the server, steering information for each traffic lane on a road based on the driving information; storing the created steering information for each traffic lane on a road in a driving information database; receiving, by an automotive communication unit within the server, path information, traffic lane information and location information from an unmanned autonomous traveling vehicle; searching, by the control unit, the driving information database for steering information for a corresponding traffic lane; and transmitting the steering information for the corresponding traffic lane to the unmanned autonomous traveling vehicle.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Additionally, it is understood that the below methods are executed by at least one server. The term control unit refers to a hardware device that includes a memory and a processor which is integrated with the server. The memory is configured to store the modules/units that execute instructions and the processor is specifically configured to execute said instructions to perform one or more processes which are described further below.

Furthermore, the control logic of the present invention may be embodied as non-transitory computer readable media on a computer readable medium containing executable program instructions executed by a processor or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, exemplary embodiments of the present invention will be described in detail with reference to the accompanying drawings.

Figure 1:
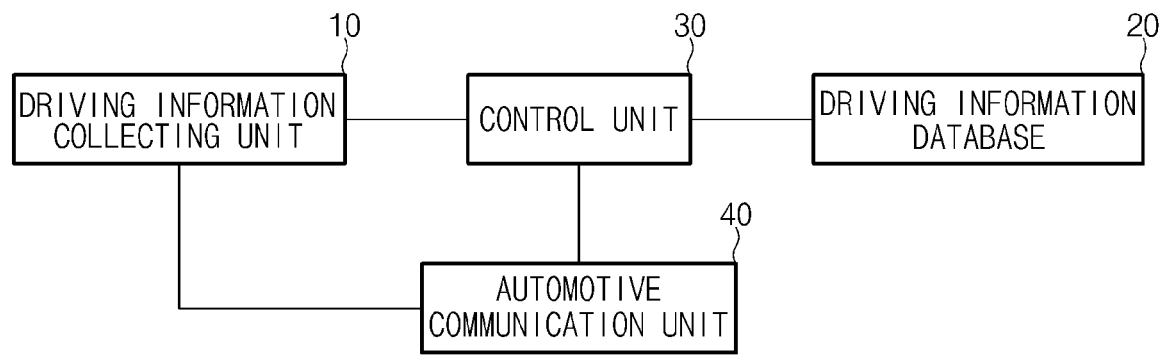
FIG. 1 is a block diagram of an unmanned autonomous traveling service apparatus based on driving information database, according to an exemplary embodiment of the present invention.

FIG. 1 is a block diagram of an unmanned autonomous traveling service apparatus based on driving information database according to an exemplary embodiment of the present invention. As shown in FIG. 1, the unmanned autonomous traveling service apparatus based on driving information database according to the exemplary embodiment of the present invention is a kind of server to which at least one unmanned autonomous traveling vehicle is connected, and includes a driving information collecting unit 10, a driving information database 20, a control unit 30, and a vehicle communication unit 40.

Specifically, the driving information collecting unit 10 communicates with a plurality of vehicles and collects driving information such as country information, departure point information, destination point information, location information, steering information, deceleration/acceleration information and traffic lane information.

The driving information is provided by non-autonomous vehicles (i.e., normal vehicles) driven by drivers throughout the world, and each of the normal vehicles includes a communication device which cooperates with an electronic control unit (ECU) therein or transmits the driving information acquired through automotive networks to the driving information collecting unit 10 via the Internet. Here, the automotive networks include a local interconnect network (LIN), a controller area network (CAN), a FlexRay, a media oriented systems transport (Most) and so on.

Further, the communication device mounted on each of the vehicles has its identification information and transmits the driving information along with the identification information, such that the control unit 30 on the server may identify where the driving information collected by the driving information collecting unit 10 originated from. Here, the identification information includes country information like a barcode.

Therefore, the control unit 30 may identify when the driving information collected by vehicles throughout the world originated from, and may establish the driving information database 20 with a certain weight associated with each piece of data, based on the reliability for each origin. Here, the reliability information is determined based on drivers' driving experiences, accident histories, occupations, genders and ages comprehensively, and the information may be calculated or previously calculated values may be used.

Next, the driving information database 20 embodied as a storage device that stores various types of information, stores the steering information for each traffic lane on a road created by the control unit 30. For example, in case of a straight road, steering information allowing straight traveling is stored, and, in case of a curvy road, steering information allowing curvy traveling is stored. Here, the steering information for each traffic lane includes location information.

Next, the control unit 30 creates the steering information for each traffic lane on a road based on the driving information collected by the driving information collecting unit 10 to store the information in the driving information database 20.

Further, in creating the steering information for each traffic lane on a road, the control unit 30 determines a path based on country information, location information, deceleration/acceleration information, departure point information, destination point information, and then creates the steering information for each traffic lane on a road based on the steering information on the road. Here, the control unit 30 may identify the origins of the respective driving information to assign a weight based on the reliability of the data. That is, the driving information from a driver with higher reliability is considered to be more accurate than the driving information from a driver with lower reliability.

In addition, the control unit 30 performs an authentication procedure on an unmanned autonomous traveling vehicle at the time of connecting to the unmanned autonomous traveling vehicle in order to provide the unmanned autonomous traveling service to the vehicles registered with the services.

Next, the automotive communication unit 40 periodically communicates with unmanned autonomous traveling vehicle under the control of the control unit 30 to receive path information, location information and traffic lane information from the unmanned autonomous traveling vehicle, and, after determining the location and the traffic lane, transmits the steering information of the corresponding traffic lane to the unmanned autonomous traveling vehicle periodically.

Accordingly, the unmanned autonomous traveling vehicle performs autonomous traveling based on the steering information transmitted from the unmanned autonomous traveling service apparatus. However, when an accident has occurred requiring the unmanned autonomous traveling vehicle to stop or change the traffic lane, the unmanned autonomous traveling vehicle makes its own decision to control itself.

In addition, the automotive communication unit 40 is connectable to the Internet, and receives the driving information from vehicles throughout the world.

Figure 2:
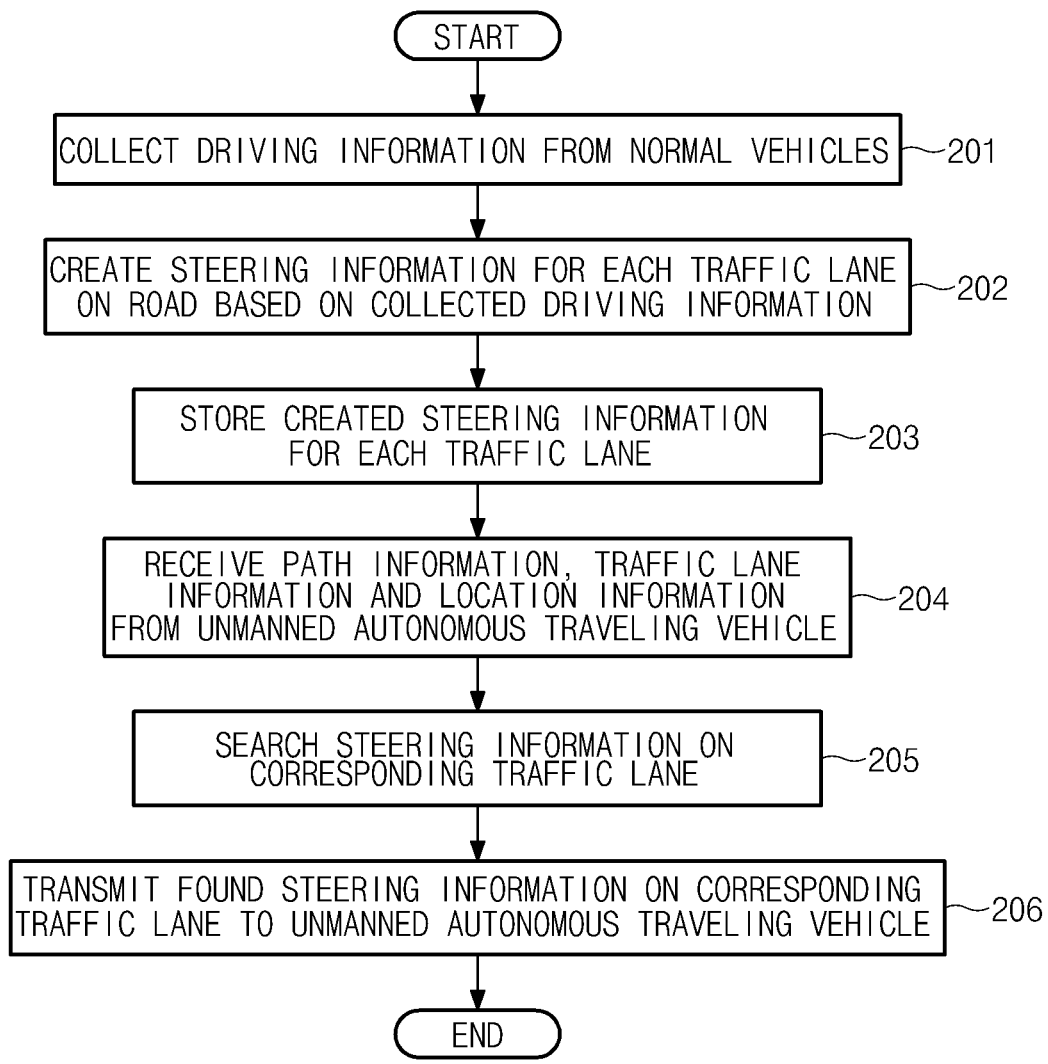
FIG. 2 is a flowchart of an unmanned autonomous traveling service method based on driving information database, according to an exemplary embodiment of the present invention.

FIG. 2 is a flowchart of an unmanned autonomous traveling service method based on driving information database, according to an exemplary embodiment of the present invention. Initially, a driving information collecting unit 10 collects driving information from normal vehicles (201). Then, a control unit 30 generates steering information for each traffic lane based on the collected driving information (202). The created steering information for each traffic lane on a road is stored in a driving information database 20 (203).

An automotive communication unit 40 receives path information, traffic lane information and location information from an unmanned autonomous traveling vehicle (204), and the control unit 30 searches the driving information database 20 for the steering information relating to the traffic lane (205). The automotive communication unit 40 transmits the found steering information for the traffic lane to the unmanned autonomous traveling vehicle (206).

Through the above stages, autonomous traveling may be performed stably without performing a large scale computing process in real time. As stated above, according to the exemplary embodiments of the present invention, the unmanned autonomous traveling vehicle is autonomously operated based on driving information created as a database and is autonomously operated based on one or more sensors installed on the vehicle at the time of a traffic lane change or an unexpected situation. The driving information is collected from drivers throughout the world to create the database for the driving information and provides an unmanned autonomous traveling vehicle based on the database, thereby making it possible to allow the unmanned autonomous traveling vehicle to be autonomously operated stably without performing a large scale computing process in real time.

What is claimed is:

1. An unmanned autonomous traveling service apparatus based on driving information database, the apparatus comprising:
    a server including:
        a driving information collecting unit configured to collect driving information from normal vehicles;
        a control unit configured to generate steering information for each traffic lane on a road based on the driving information collected by the driving information collecting unit;
        a driving information database that stores the steering information for each traffic lane on a road created by the control unit; and
        an automotive communication unit configured to receive path information, traffic lane information and location information from an unmanned autonomous traveling vehicle, and transmit steering information on a corresponding traffic lane to the unmanned autonomous traveling vehicle,
    wherein the control unit, when the automotive communication unit receives the traffic lane information from the unmanned autonomous traveling vehicle, searches the driving information database for the steering information on the corresponding traffic lane, and controls the automotive communication unit such that it transmits the found steering information to the unmanned autonomous traveling vehicle.

2. The apparatus according to claim 1, wherein the control unit, at the time of creating the steering information for each traffic lane on a road based on the driving information, assigns a weight to each piece of the steering information for each traffic lane according to reliability of the driving information.

3. The apparatus according to claim 1, wherein the driving information contains at least one of country information, departure point information, destination point information, location information, steering information, deceleration/acceleration information, and traffic lane information.

4. The apparatus according to claim 1, wherein the unmanned autonomous traveling service apparatus is applied to hybrid vehicles, electric vehicles, or hydrogen-powered vehicles.

5. An unmanned autonomous traveling service method based on driving information database, the method comprising:
    collecting, by a driving information collecting unit on a server, driving information from normal vehicles;
    creating, by a control unit on the server, steering information for each traffic lane on a road, based on the driving information;
    storing the created steering information for each traffic lane on a road in a driving information database;
    receiving, by an automotive communication unit, path information, traffic lane information and location information from an unmanned autonomous traveling vehicle;
    searching, by the control unit, the driving information database for steering information for a corresponding traffic lane; and
    transmitting the steering information for the corresponding traffic lane to the unmanned autonomous traveling vehicle,
    wherein the creating of the steering information includes assigning a weight according to reliability of the driving information to create the steering information for each traffic lane.

6. The method according to claim 5, wherein the driving information contains at least one of country information, departure point information, destination point information, location information, steering information, deceleration/acceleration information, and traffic lane information.

7. The method according to claim 5, wherein the unmanned autonomous traveling service method is applied to hybrid vehicles, electric vehicles, or hydrogen-powered vehicles.

8. A non-transitory computer readable medium containing program instructions executed by a processor or controller, the computer readable medium comprising:
    program instructions that collect driving information from normal vehicles;
    program instructions that collect steering information for each traffic lane on a road, based on the driving information;
    program instructions that steer the created steering information for each traffic lane on a road in a driving information database;
    program instructions that analyze path information, traffic lane information and location information from an unmanned autonomous traveling vehicle;
    program instructions that search the driving information database for steering information for a corresponding traffic lane; and
    program instructions that transmit the steering information for the corresponding traffic lane to the unmanned autonomous traveling vehicle,
    wherein the program instructions that create the steering information includes program instructions that assign a weight according to reliability of the driving information to create the steering information for each traffic lane.

9. The non-transitory computer readable medium according to claim 8, wherein the driving information contains at least one of country information, departure point information, destination point information, location information, steering information, deceleration/acceleration information, and traffic lane information.

10. The non-transitory computer readable medium according to claim 8, wherein the non-transitory computer readable medium is applied to hybrid vehicles, electric vehicles, combustion, or hydrogen-powered vehicles.

* * * * *